March 14, 1950  J. F. MULLEN ET AL  2,500,854
CASTER Filed June 18, 1949  3 Sheets-Sheet 1

INVENTORS
JAMES F. MULLEN
JAMES S. HANSON
BY
Kenyon & Kenyon
ATTORNEYS

Patented Mar. 14, 1950

2,500,854

UNITED STATES PATENT OFFICE 2,500,854

CASTER

James F. Mullen, Mount Vernon, N. Y., and James S. Hanson, Rowayton, Conn., assignors to The Fairbanks Company, New York, N. Y., a corporation of New Jersey Application June 18, 1949, Serial No. 99,932

11 Claims. (Cl. 16—21)

This invention relates to casters, more particularly casters of the swivel type.

Casters are extensively used whenever it is desired to provide a support for any of a great variety of different objects to provide rolling friction between the object supported thereby and a floor or other pavement. Generally speaking, the loads imposed on casters are large in relation to the size and weight of the caster parts. Casters are, of course, subjected to static loads imposed by the weight of the object supported thereby. However, when casters are used for their intended purpose, namely, to enable the object supported thereby to be rolled along a floor or pavement, they are frequently subjected to very severe strains. Thus, if a heavy object supported by casters were to be moved at a substantial speed and if one of the casters supporting it should strike an obstacle such as a doorsill or should fall into a depression such as a rut, thereby causing a sudden stoppage of the movement of the object, it is apparent that the caster affected will be subjected to a severe strain, particularly in a direction parallel to the pavement, depending on the weight of the object, the rate at which it was being moved and the suddenness of its deceleration. Moreover, in the case of casters of the swivel type, such casters in order to have their intended utility, should be capable of swiveling while under load so as to accommodate the direction of the caster wheel to the direction of movement of the object. It is important, therefore, that casters of the swivel type be so constructed as to equalize shocks and strains and at the same time maintain the relationship between the fork and the top plate so as to take maximum advantage of the entire bearing surface.

The basic elements of a caster of the swivel type are a wheel rotatably carried by an axle, a fork member having a pair of legs the lower ends of which provide means for carrying the axle of the wheel, a support such as a plate for securement to an object, a bearing between the fork and the support, and means for maintaining the fork in position relative to the support for rotation relatively thereto with the bearing therebetween.

Heretofore, casters of the character referred to have generally been produced in various sizes from pressed steel or other metal. Usually in the large size casters the metal used is of somewhat heavier gauge in order to afford greater strength but in any case it has been a prime objective to get the most strength for the weight of the metal used so as to hold down cost to a minimum and so as to minimize the weight of the caster for the load it is designed to carry.

It is one of the principal objects of this invention to provide casters which for their size and weight are much stronger than casters previously produced both as regards static loads and as regards shock loads encountered in service. It likewise is a further important object of this invention to provide casters which while under load swivel much more readily than casters previously produced.

The improvements whereby the aforesaid objects have been successfully attained in very high degree pertain to the construction of the fork member of the caster wherein a new load-carrying and load-distributing construction has been utilized which not only affords an extremely great increase in the strength and ruggedness of the caster in relation to its weight but also affords an extremely great improvement in the ease of swiveling action under load. In both of these respects tests have shown that improvements amounting to 200% to 300% have been realized according to this invention as compared with casters of corresponding size and weight which now are on the market, thus demonstrating that a new principle of action has been afforded.

In the new caster of this invention the fork member which is employed comprises the basic and essential elements required for a fork construction, namely, a horizontally disposed member presenting a bearing surface, an annular skirt integral therewith and extending downwardly therefrom, and a pair of downwardly extending complementary legs which are integral at their upper ends with the skirt and which terminate at their lower ends in the form of spaced parallel journal members having holes therein for carrying the axle of the caster wheel so as to be somewhat offset from the axis of the skirt. The entire fork is composed of metal, ordinarily steel, of appropriate gauge. According to this invention the extremely great improvements in the strength of the caster and in its swiveling action under load are afforded by the special construction of the legs of the fork in the zone between the spaced parallel journal members and the skirt, in relation to the other elements which make up the fork as a whole.

In testing a caster for its strength characteristics, the caster is subjected to such severe conditions of overload and/or shock impacts that a point of failure eventually is reached. Such failure in any case involves excessive distortion of some portion of the caster. This distortion may occur at the king bolt if the caster is of the king bolt type, or at the swivel bearing (even with spilling out of the ball bearings), or because of the bending over or collapse of the legs. Under usual service conditions excessive distortion of the fork is the most usual type of failure.

The new caster of this invention has been exhaustively tested for its strength characteristics in comparison with conventional casters on the open market which are of corresponding size and weight. Thus, according to one such test the caster was subjected to conditions of overload combined with laterally imposed shocks thus reproducing conditions corresponding to those encountered under very extreme conditions of service abuse. Under this test conventional casters failed after periods of one to four miles. The improved caster of this invention, on the other hand, endured this test for twenty-eight miles without showing any deformation whatever, except for the wearing down of the tread of the caster wheel, when the caster was cut in two to permit its inspection. Under states load tests a very pronounced increase in strength prior to failure was also recorded as compared with conventional casters of corresponding size and weight now on the market.

The new caster of this invention has likewise been exhaustively tested for the purpose of determining the amount of force in foot pounds required to accomplish a swiveling of the caster under varying conditions of load. The results obtained in the case of a caster of the 4" size embodying this invention are typical and may be contrasted with the results obtained in testing three conventional casters of corresponding size which are now on the market. The rated load for a 4" caster is 300 pounds. Under this load the force required for swiveling the new caster of this invention was .335 foot pound as compared with from .671 to .898 foot pound for the conventional casters compared therewith. At a lower load of 100 pounds the force required for swiveling the new caster was .168 foot pound as compared with the range of .335 to .407 foot pound for the conventional casters compared therewith. Under a very extreme overload amounting to 6,000 pounds the swiveling force required in the case of the new caster was substantially 34.7 foot pounds as compared with the range of 74.3 to 87.4 foot pounds for the conventional casters compared therewith. Corresponding results were obtained for other loads and for other caster sizes.

Both the improved strength characteristics and the improved swiveling characteristics of the new caster of this invention stem from the novel leg construction of the caster fork. This novel leg construction is characterized by a compound arch structure which in each leg comprises a substantially arcuate journal-plane arch segment which, as this term indicates, is substantially in the plane of the journal member, and a succession of substantially arcuate crown-forming arch segments which are in planes normal to the journal member, which at their upper ends fair into the skirt of the fork and which have their lower ends determined by the journal-plane arch segment. Preferably the radius of curvature of the journal-plane arch segment and that of the successive crown-forming arch segments are substantially the same as the radius of curvature of the skirt portion of the fork. By this novel leg construction in relation to the other fork structure as a whole, as will be more particularly described below, the very great increases in strength and swiveling action have been afforded according to this invention.

Casters of the swivel type come in various sizes, and the principle of the novel construction afforded according to this invention is applicable to any size caster. The size of a caster is customarily given in terms of the diameter of the caster wheel. The most usual caster sizes are 2", 2½", 3", 4", 5" and 6". Of course, the size of the caster is proportioned to accommodate the size wheel that is used. While the relative dimensions of the caster parts may vary considerably for the different sizes of caster, as will be referred to more in detail hereinbelow, this invention is described hereinbelow, for the purpose of affording a typical example, as embodied in the 4" caster which is shown in the accompanying drawings, wherein Fig. 1 is a side elevation of a typical caster which comprises a fork member embodying this invention;

Fig. 2 is a rear elevation of the caster shown in Fig. 1;

Figures 5, 6, 7, 8:
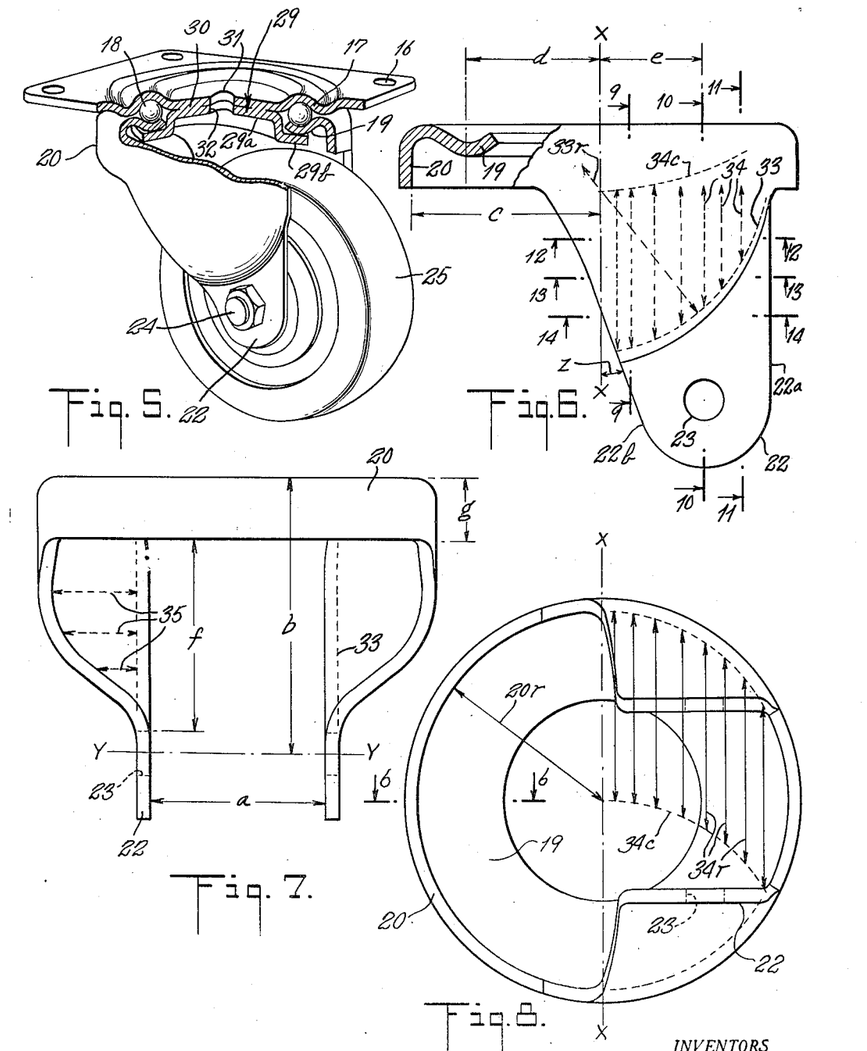
Fig. 5 is a perspective view of the caster shown in Fig. 1 with certain parts thereof broken away to show the construction detail.
Fig. 6 is a side elevation of the fork member of the caster shown in Figs. 1 to 5 with a portion in section on the line 6—6 of Fig. 8, the showing being on a somewhat larger scale and indicating the location of the journal-plane arch.
Fig. 7 is a front elevation of the fork member of Fig. 6 which also shows the location of the journal-plane arch.
Fig. 8 shows the fork member of Figs. 6 and 7 as viewed from below and indicates the radii of the arc segments of the crown-forming arches.

In the embodiment shown in the drawings, the caster comprises a support which as shown is in the form of a plate 15 having the holes 16 therein through which screws or bolts may be passed for firmly securing the plate 15 to the object to be carried by the caster. While the support member has been shown in the form of a plate, it is apparent that it can take any other form which is appropriate for its being carried by the object supported by the caster. On the face of the plate 15 there is the annular trough 17 which is best shown in Fig. 5 and which provides one surface of a ball race for the ball bearings 18.

The fork member of the caster has the function of carrying the axle of the caster wheel in swiveled relation to the support plate 15. The upper portion of the fork member is horizontally disposed for presenting a bearing surface for the ball bearings, the upper portion of the fork in the embodiment shown having the annular trough 19 therein which presents this bearing surface. Extending downwardly from the upper horizontally disposed portion of the fork is the skirt 20. Extending downwardly from this skirt are the two complementary legs which are indicated generally by the reference character 21 and the detail of the construction of which will be described hereinbelow. At the lower end of the legs 21 are the spaced parallel journal members 22 having the holes 23 to carry the axle 24 of the caster wheel 25. The axle 24 may be in any suitable form and is shown as being in the form of a bolt having the head 26 at one end and the nut 27 in threaded engagement with the other end. In order to prevent binding of the caster wheel when the nut 27 is tightened, the bushing 28 extends between the opposed faces of the journal members.

In order to prevent the fork member from becoming separated from the support plate, the cup member is provided which is indicated generally by the reference character 29 and which comprises the center disk portion 29a and the annular flange 29b which overlies the bearing channel 19 of the fork member with a slight amount of clearance when the ball bearings 18 are under compression between the fork and the support plate. In the embodiment shown, abutting portions of the disk 29a of the cup member and of the support plate are integrally united as by resistance welding 30 which constitutes preferred construction. However, the support plate and the fork may, if desired, be united by the more conventional expedient of using a bolt or rivet (not shown) passing through the holes 31 and 32 in the support plate 15 and cup member 29, respectively.

The caster as described thus far is generally similar to many makes of caster that are now on the market except that the conventional construction is to extend the horizontally disposed portion of the fork substantially flush with the hole 31 in the support plate 15 and to use a simple disk or washer corresponding to the portion 29a of the cup member 29, the parts in such case being maintained in assembled relation by a bolt or rivet. This more conventional type of assembly may, if desired, be employed in the practice of this invention, and, more generally, any suitable means may be employed for maintaining the fork in swiveled relation with respect to a support plate or the like with a swivel bearing therebetween.

As stated hereinabove, the improvements afforded according to this invention pertain to the novel construction of the leg members of the caster. In conventional casters these leg portions are usually formed from pressed sheet metal so that the web of metal between the journal members 22 and the skirt 20 is carried upwardly into the skirt 20 with different configurations depending upon the particular make of caster, but in any case in a way which we have found to be greatly inferior to the novel construction of this invention both from the point of view of over-all caster strength and from the point of view of ease of swiveling action.

The novel type of leg construction which affords the very great improvements hereinabove described is exemplified in the caster shown in the drawings, and the details of which are shown especially in Figs. 6 to 14 which are full size and approximately to scale for a typical 4" caster embodying this invention. As indicated in these figures, each leg comprises a compound arch structure. One of the arches or arch segments is that which is best shown in Figs. 6 and 7 and which is referred to herein as the journal-plane arch. This journal-plane arch is indicated by dotted lines to which the reference character 33 has been applied. This arch is an arc segment whose radius 33r is the same as the radius 20r of the skirt 20. The radial dimensions here, as well as in all other instances, are taken from the center point of the arc to the inner surface of the metal as shown. The journal-plane arch, as best shown in Fig. 7, is essentially in the plane of the journal member 22 although the dimension thereof is taken substantially in the plane of the outer face of the journal member. The upper end of the journal-plane arch fairs into the skirt essentially in alignment therewith and sweeps downwardly through an arc of about 75° to the opposite edge of the caster leg and a short distance above the hole 23 which is sufficient to accommodate the head or nut associated with the wheel axle.

Figure 9:
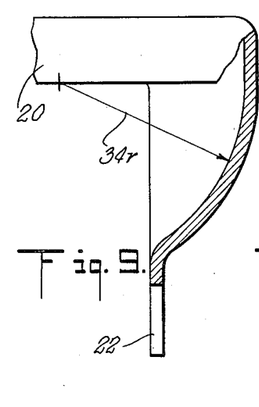
Figs. 9, 10 and 11 are partial sections of the fork member taken on the lines 9—9, 10—10 and 11—11 respectively of Fig. 6.
Figure 10:
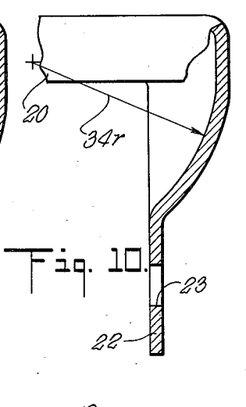
Figure 11:
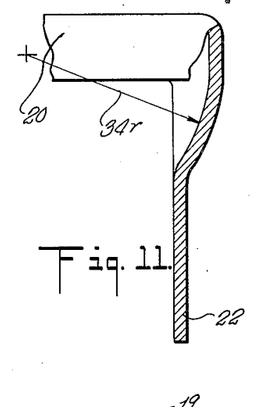
Figure 12:
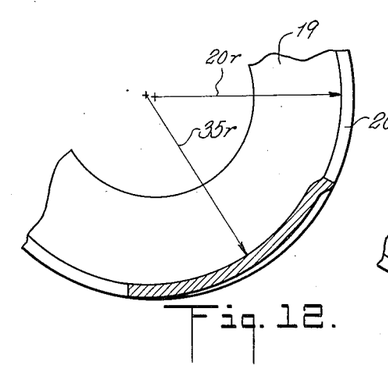
Figs. 12, 13 and 14 are cross sections of the fork member taken respectively on the lines 12—12, 13—13 and 14—14 of Fig. 6.
Figure 13:
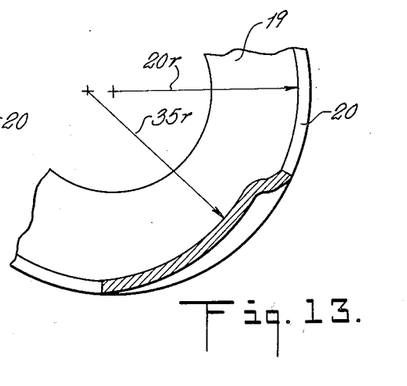
Figure 14:
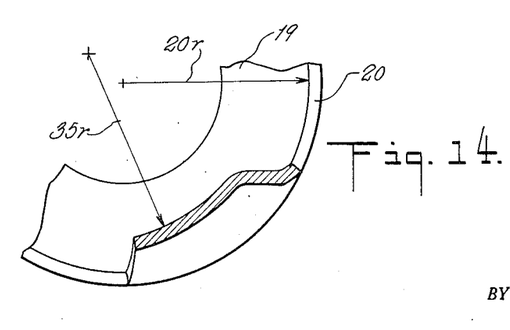

In vertical planes normal to the journal member of each leg there is a succession of what are referred to herein as the crown-forming arches which are indicated by dotted lines in Fig. 6 to which the reference character 34 is applied. The arches are arc segments whose radii 34r are the same as the radii 33r and 20r of the journal-plane arch 33 and of the skirt 20 respectively. The upper ends of the crown-forming arches fair into the skirt 20 in substantial alignment therewith and their length is determined by where they intersect the journal-plane arch. The centers of the radii 34r are indicated as falling along the dotted line 34c in Figs. 6 and 8. Figs. 9, 10 and 11 show the crown-forming arches at typical sections at the lines 9—9, 10—10 and 11—11, respectively, of Fig. 6. It is seen that the upper ends of these arches fair into the skirt in substantial alignment therewith. However, it is not essential that the centers of the successive crown-forming arches all fall in a horizontal plane, and as a matter of fact the normal construction is similar to that shown wherein the centers of the crown-forming arches more remote from the center line of the skirt are slightly more elevated than those more adjacent the center line of the skirt.

The foregoing are the most important structural features of the novel leg construction of this invention. However, it is preferable, as shown, that the portion of each leg between the skirt and the lower limit of the journal-plane arch likewise be in the form of a succession of arcuate arch segments in horizontal planes. These arches in three locations are shown in Fig. 7 by the dotted lines to which the reference character 35 is applied and they occur at the planes of the cross sections shown in Figs. 12, 13 and 14 on the lines 12—12, 13—13 and 14—14, respectively, of Fig. 6. The radii 35r of these arch segments again are the same as the radius 20r of the skirt 20.

Figures 1, 2:
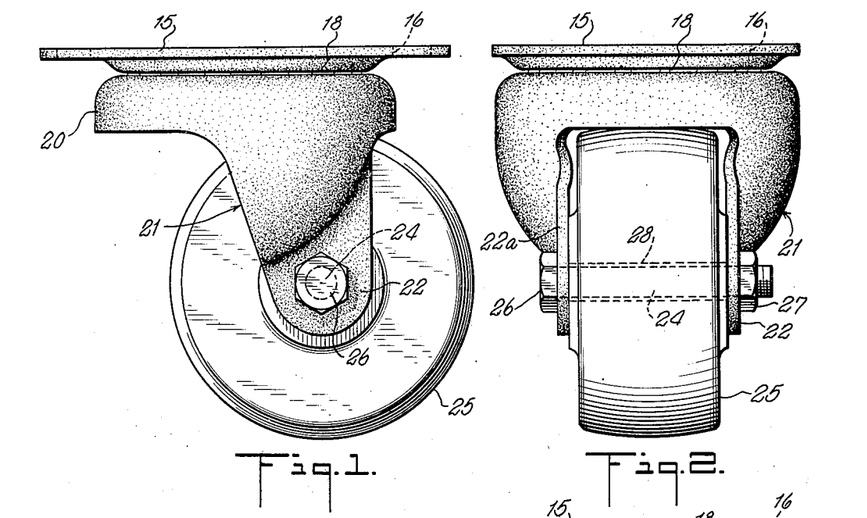
Figures 3, 4:
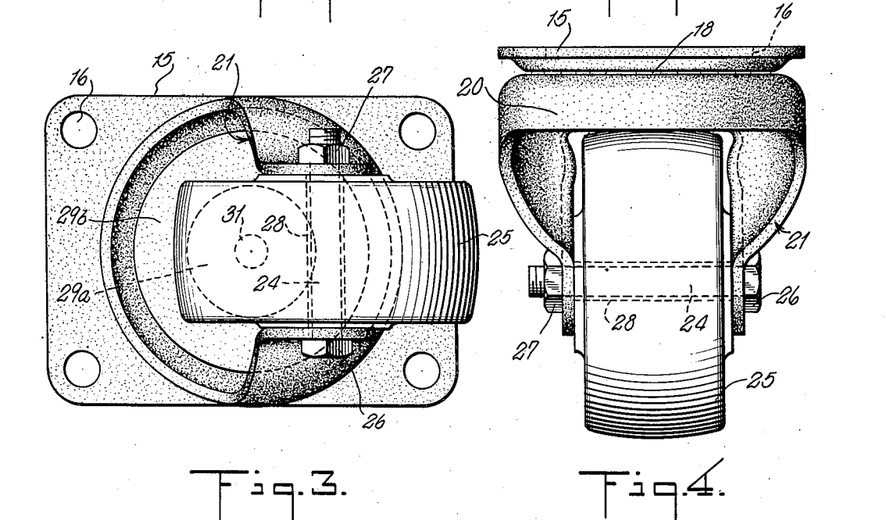
Fig. 3 shows the caster of Fig. 1 as viewed from below.
Fig. 4 is a front elevation of the caster shown in Fig. 1.

In the embodiment shown the axle-carrying holes 23 in the journal members 22 are located so that the center line $y$—$y$ thereof is offset from the center line $x$—$x$ of the skirt 20 by a distance $e$ which is approximately 77% of the radial distance $d$ of the annular bearing surface presented by the annual channel 19, the distance $d$ in turn being about 76% of the internal radial distance $c$ of the skirt 20. The distance $f$ from the upper margin of the hole 23 to the lower margin of the skirt 20 in the embodiment shown is substantially equal to the distance $c$ which is the internal radius of the skirt and the distance $a$ between the internal faces of the journal members 22 is slightly less than (about 96% of) the distance $c$. By virtue of the offsetting of the center line $y$—$y$ of the holes 23 with respect to the center line $x$—$x$ of the skirt 20 the side 22a of the journal member 22 extends substantially vertically upwardly to the skirt 20 with a twist therein (see Fig. 2) as it merges with the load-distributing arch or journal-plane arch, 33 so as to bring the outer marginal edge corner of the metal immediately below the skirt into vertical alignment with a vertical plane between the inner and outer surfaces of the journal member thereby increasing the section modulus. The upper portion of the leg is integral with the skirt from this point through an arc of about 85°. The other side 22b of the journal member 22 as well as the arched portion of the leg makes an angle $z$ to a vertical plane normal to the journal member which on the average is approximately 30°. This angle is largely a matter of optional configuration although it usually is of the order of 20° to 40°.

While the greatly improved strength and swiveling characteristics afforded by the new caster leg construction have been demonstrated, and the extent thereof standing alone evidences that the construction is critically different from that of conventional casters, the following comments are made as to the principle involved whereby the improvements are obtained although the correctness of the theory advanced is not to be regarded as affecting the essential novelty, utility and advantages of the structure described and claimed herein.

According to the construction above described, the distribution of the loads encountered in use, i. e., both static and shock, become equalized in a construction wherein there is no portion which is such as to be peculiarly vulnerable to distortion as compared with other portions thereof. Any load which is imposed on a caster is initially applied to the axle of the caster wheel and, therefore, becomes concentrated, as far as the legs of the caster are concerned, at the holes in the journal members thereof which carry the axle of the caster wheel. This is the case whether the load imposed is vertical or is horizontal, the latter being occasioned as for example when the caster strikes a doorsill or the like during movement of an object to which the caster is attached. In conventional casters such loads become transmitted to certain parts of the fork so that failure occurs at such parts, depending on the construction employed, considerably before other parts of the caster approach the failure point. This is due principally to the fact that the offsetting of the caster wheel axle relative to the axis of the fork so as to provide the swiveling action creates unequal stresses with resultant concentrations of load particularly along one or the other of the marginal edges of the legs. Moreover, such unequal stresses cause the load to be so imposed that the swiveling of the caster is decidedly affected by the load applied.

According to the new construction of the fork member of casters of the kind in question herein, there is much improved distribution of the loads from the holes in the journal members of the legs to the other caster parts, the improved load distribution in further combination with the greater structural strength of the leg construction affording much greater strength characteristics for the weight of metal employed. Thus the effect of the combination of the journal-plane arch segment and the succession of crown-forming arch segments is regarded as having the effect of concentrating the imposed loads centrally between the edges of the legs at the crown of the compound arch structure below the skirt margin for equalized distribution to the skirt and thence to the bearing. In any event it has been demonstrated that because of the effect of the peculiar compound arch structure on imposed loads, it is possible to obtain extremely great resistance of collapsing or folding of the legs of the fork, which is one of the most common sources of caster failure. Moreover, the compound arch structure minimizes localization of strains at the caster bearing and affords better over-all strength characteristics of the bearing assembly in service. These greatly improved strength characteristics are afforded not only with regard to resistance to static loads but also with regard to resistance to shock loads which are imposed for the most part horizontally, for such shock loads are likewise carried into the skirt of the fork member by the compound arch configuration in the manner that has been described and become equalized therealong.

The fact that the new caster leg construction of this invention accomplishes the distribution of loads imposed on the caster in a novel and different way is also regarded as responsible for the greatly improved swiveling action of the improved caster, for the great differences in performance in this respect are regarded as explicable only because in the case of conventional caster constructions the load is imposed so unequally on the balls of the bearing that most of the advantage resulting from the total extent of the bearing surface is lost, while in the case of the new construction there is such greatly improved distribution of load to the bearing that the bearing surfaces provided function with much greater efficiency.

While this invention has been described in connection with a specific embodiment thereof, it is apparent that the principle underlying the new construction is adaptable to varying types of caster design. In fact, this is necessarily the case in order to adapt the new principle of construction to casters of different sizes wherein the relative dimensions may differ considerably as between the different sizes, particularly with regard to dimensions such as the distance between the inner faces of the journal members (dimension $a$); the height of the caster as determined by the distance from the top of the caster fork to the center line of the axle-carrying holes in the journal members (dimension $b$); the radius of the skirt (dimension $c$); the radius of the bearing (dimension $d$); and the width of the skirt (dimension $g$). For the purposes of further exemplification, illustrative values for these dimensions in the case of the typical casters embodying this invention within the usual range of caster sizes from 2″ to 6″ are given in the following table:

| Caster Size | Dimensions in Inches | | | | |
|---|---|---|---|---|---|
| | a | b | c | d | g |
| 2″ | 1⅛ | 1 5⁄16 | 1 1⁄16 | .54 | 5⁄16 |
| 2½″ | 1⅜ | 1⅝ | 1¼ | .74 | 7⁄16 |
| 3″ | 1 7⁄16 | 2 | 1 5⁄16 | .88 | ½ |
| 4″ | 1¾ | 2 11⁄16 | 1 13⁄16 | 1.28 | ⅝ |
| 5″ | 2 | 3 5⁄16 | 2 7⁄16 | 1.50 | ¾ |
| 6″ | 2 5⁄16 | 3⅞ | 2 7⁄16 | 1.50 | ¾ |

A comparison of the foregoing dimensions makes it apparent at once that there is a considerable variation in relative proportions. Thus, the ratio of the skirt radius to the height from the top of the fork to the center line of the axle-carrying holes $$\left(\frac{c}{b}\right)$$

varies from approximately .5 for the 2'' caster to approximately .75 for the 5'' caster. The ratio of the skirt radius to the distance between the inner faces of the journal members $$\left(\frac{c}{a}\right)$$

varies from approximately .6 for the 2'' caster to approximately 1.2 for the 5'' caster. The ratio of the skirt radius to the bearing radius $$\left(\frac{c}{d}\right)$$

varies from approximately 1.3 for the 2'' caster to the approximately 1.6 for the 5'' or 6'' caster. The ratio of the bearing radius to the height from the top of the fork to the center line of the axle holes $$\left(\frac{d}{b}\right)$$

varies from approximately .4 for the 2'' caster to approximately .5 for the 4'' caster, and the ratio of the skirt width to the skirt radius $$\left(\frac{g}{c}\right)$$

varies from about .45 for the 2'' caster to about .3 for the 5'' or 6'' caster. Somewhat more generally, the relative dimensions of the casters vary primarily depending upon the width of the caster wheel hub in relation to its diameter and the height of the fork required to accommodate the diameter of the caster wheel. However, for all such variations the principle of construction according to this invention may be successfully applied not only in connection with casters of the size range from 2'' to 6'' but also for other sizes, for especially in connection with certain industrial uses casters of considerably larger size may advantageously be made according to this invention. Usually in commercial caster construction the value of the ratio $$\left(\frac{c}{b}\right)$$

will vary between about .3 and about .8; the value of the ratio $$\left(\frac{c}{a}\right)$$

will vary between about .6 and about 1.3; the value of $$\left(\frac{d}{b}\right)$$

will vary from about .4 to about .5; the value of $$\left(\frac{c}{d}\right)$$

will vary from about 1.2 to about 1.7; and the value of the ratio $$\left(\frac{g}{c}\right)$$

will vary from about .3 to about .5.

In practicing this invention the most important structural features are the respective journal-plane and crown-forming arches hereinabove referred to. The journal-plane arch, to serve its proper function, should fair into the skirt in substantial alignment therewith and should sweep downwardly through an arc of at least about 60°. The extent to which it is carried depends upon the configuration of the edge of the leg at which it terminates but in any case does not exceed about 90°. In usual practice in conformity with preferred leg construction this arch extends through an arc of about 65° to 80°. The radius of the arc segment constituting the journal-plane arch preferably is substantially the same as the radius of the skirt of the fork. However, variations to the extent of about 20% of the skirt radius, so as to be either greater than the skirt radius or less than the skirt radius are within a reasonable range of tolerance. If the journal-plane arch fairs into the skirt in substantial alignment therewith, then it necessarily follows that the center of the arc of the journal-plane arch is either in the plane of the lower margin of the skirt or approximately in this plane. In the particular embodiment shown in the drawing the center of this arch is slightly above the lower margin of the skirt. However, this is not essential to achieving the desired result and the location of the center of this arch depends for the most part on the location of the holes 23, the best construction being that wherein the arc comes in that proximity to the holes which affords sufficient clearance for the axle bolt head, or nut, so that a suitable tool can be applied thereto.

With regard to the crown-forming arches that are normal to the journal members, the arc segments thereof preferably are such that the radii are substantially the same as the radius of the skirt. However, variations either greater or less than the radius of the skirt corresponding to 20% of the skirt radius are within reasonable tolerances. These arches fair into the skirt at their upper ends in substantial alignment therewith and this, of course, requires that the centers thereof lie in the plane corresponding to the lower margin of the skirt or approximately so. In the usual case the centers for these arches are in planes somewhat higher than the lower margin of the skirt adjacent where the load-distributing arch merges with the skirt than adjacent the opposite margins of the legs as shown best in Fig. 6. However, it is not essential that this be the case.

In order that the advantages of distribution of strains be taken full advantage of, the upper portion of each of the legs should merge with the fork skirt along a substantial arc. This may vary considerably. Thus, especially in the case of the small size casters this arc may be as low as about 60°. In the larger sizes this arc may be as high as about 95° due to the manner of carrying the leg margin into the skirt. Ordinarily this arc is between about 65° and 90°.

With regard to the configuration of the leg portions between the lower margin of the skirt and the journal-plane arch in horizontal planes it has previously been stated that the configuration in each plane is preferably in the form of an arc segment whose radius is substantially equal to that of the skirt. However, in going from the lower margin of the skirt to the lower portion of the journal-plane arch there may be some deviation in this regard although it is desirable in any event that the configuration in horizontal planes of the portion of the legs in question be in the form of a succession of arch segments in the form of arcs whose average radii do not differ from that of the skirt radius by more than 20% of the skirt radius.

With regard to the journal members, it is always the case that they are spaced apart by a distance substantially less than the skirt diameter and the usual ratio of the skirt radius to this spacing has been indicated. The holes in the journal members which carry the axle of the caster wheel are such that their common center line is substantially offset from the skirt center line so as to insure swiveling of the caster. This offset ordinarily is less than the bearing radius while being greater than half the bearing radius. Optimum conditions have been found to be afforded in the practice of this invention when this offset is of the order of 77% of the bearing radius, although good operation is afforded when this offset is of the order of 65% to 90% of the bearing radius.

We claim:

1. In a caster of the character described, a fork comprising a horizontally disposed bearing member presenting an annular bearing surface, a substantially vertically disposed downwardly extending annular skirt integral with said bearing member, and a pair of downwardly extending essentially complementary legs integral with said skirt and terminating in parallel journal members having axle-carrying holes therein substantially aligned on a common center line that is substantially offset from the axis of said skirt, said journal members being spaced apart by a distance substantially less than the diameter of said skirt, each of said legs being integral with said skirt along about 60° to about 95° of arc, and each of said legs being characterized by a substantially arcuate journal-plane arch segment which is substantially in the plane of said journal member, the radius of which does not differ from radius of said skirt by more than about 20%, the upper end of which fairs into said skirt in substantial alignment therewith at the margin of said leg on the side of said center line remote from said skirt axis, and which extends downwardly passing above and adjacent said axle-carrying hole through an arc of about 60° to about 90° to the opposite margin of said leg and being further characterized by a succession of substantially arcuate arch segments in planes normal to said journal member which have respective radii that do not differ from the radius of said skirt by more than about 20%, the lower extremities of which are determined respectively by points disposed along substantially the entire length of said journal-plane arch segment and the upper extremities of which fair into said skirt in substantial alignment with said skirt.

2. In a caster of the character described, a fork according to claim 1 wherein said center line of said axle-carrying holes in said journal members is offset from the axis of said skirt by a distance less than but at least half of the radius of said annular bearing surface.

3. In a caster of the character described, a fork according to claim 1 wherein said center line of said axle-carrying holes in said journal members is offset from the axis of said skirt by a distance less than but at least half the radius of said annular bearing surface, wherein the ratio of the radius of said skirt to the vertical distance between the top of said fork and the center line of said axle-carrying holes is from about .3 to about .8, wherein the ratio of the radius of said skirt to the distance between said journal members is from about about .6 to about 1.3, and wherein the ratio of the radius of said bearing surface to said vertical distance between the top of said skirt and the center line of said axle-carrying holes is about .4 to about .5.

4. In a caster of the character described, a fork comprising a horizontally disposed bearing member, a vertically disposed downwardly extending annular skirt integral with said bearing member and a pair of essentially complementary downwardly extending legs integral with said skirt and terminating at their lower ends in substantially parallel journal members which are spaced apart by a distance substantially less than the diameter of said skirt and which have axle-carrying holes therein substantially on a common center line that is substantially offset from the axis of said skirt, said legs being characterized respectively by a substantially arcuate journal-plane arch segment of about 65° to 80° of arc which is in the plane of said journal member, which at its upper end fairs into said skirt in substantial alignment therewith and which extends downwardly passing above and adjacent said axle-carrying hole to the opposite margin of said leg, and said legs being further characterized respectively by a succession of substantially arcuate arch segments which are disposed in planes normal to said journal member, each of which has substantially the same radius as said journal-plane arch segment, which are terminated at their lower ends by said journal-plane arch segment and the upper extremities of which fair into said skirt in substantial alignment therewith.

5. In a caster of the character described, a fork according to claim 4 wherein the radius of said substantially arcuate journal-plane arch segment is substantially the same as the radius of said skirt.

6. In a caster of the character described, a fork member comprising a horizontally disposed bearing member presenting an annular ball race on its upper surface, a downwardly extending skirt the ratio of the radius of which to the radius of said ball race is about 1.2 to about 1.7 and the ratio of the width of which to its radius is about .3 to about .5, a pair of essentially complementary legs integral with said skirt and extending downwardly from the lower margin thereof, opposed parallel journal members integral with said legs and constituting the lower end portion of said legs with the inner faces thereof spaced apart by a distance such that the ratio of the skirt radius to said distance is about .6 to about 1.3, said journal members each having axle-carrying holes therein whose common center line is offset from the axis of said skirt by a distance corresponding to about 65% to about 90% of the radius of said ball race and the center line of which is spaced from the top of the fork by such distance that the ratio of the radius of said skirt to said distance is about .3 to about .8, the upper extremity of each of said legs being integral with said skirt from a point approximately where the plane of the journal member intersects said skirt to a point on the skirt about 60° to 95° of arc therefrom, the margin of each of said legs as extending from said last mentioned point being inclined downwardly was to be at an angle of approximately 20° to 40° with respect to the plane of the skirt axis that is normal to said journal members, and each of said legs having a compound arch portion characterized by a substantially arcuate journal-plane arch segment which is substantially in the plane of said journal member and which defines the upper margin of said journal member, the radius of which does not differ from the radius of said skirt by more than about 20%, the upper extremity of which fairs into said skirt in substantial alignment therewith and substantially in the plane of said journal member, and which sweeps downwardly through about 60° to about 90° of arc to the opposite margin of said leg, and further characterized by a succession of substantially arcuate crown-forming arch segments in planes normal to said journal member the respective radii of which do not differ from the radius of said skirt by more than about 20%, the lower extremities of which are determined respectively by points disposed along substantially the entire length of said journal-plane arch segment and the upper extremities of which fair into said skirt in substantial alignment therewith.

7. In a caster of the character described, a fork member according to claim 6 wherein the portion of each of said legs between the lower margin of said skirt and said journal-plane arch segment is in the form of a succession of substantially arcuate arch segments in horizontal planes, the radii of said arch segments not differing from the radius of said skirt by more than about 20% of the radius of said skirt, and wherein the marginal edge of each of said legs which is the more remote from the plane of the skirt axis that is normal to the journal members is twisted from a plane normal to the journal members to a plane corresponding to the radius of the skirt with the twist located where said journal-plane arch fairs into said skirt and with the outer edge corner of the portion of said edge in the plane of the skirt radius in vertical alignment with a plane between the inner and outer surfaces of the journal member.

8. In a caster of the character described, a fork member according to claim 6 wherein the portion of each of said legs between the lower margin of said skirt and said journal-plane arch segment is in the form of a succession of substantially arcuate arch segments in horizontal planes, said arch segments in said horizontal planes, said journal-plane arch segment and said crown-forming arch segments respectively having radii substantially equal to the radius of said skirt.

9. In a caster of the character described, a fork member according to claim 6 wherein the center line of said axle-carrying holes is offset from the axis of said skirt by an amount which is approximately 77% of the radius of said annular ball race.

10. In a caster of the character described, a fork member comprising a horizontally disposed bearing member presenting an annular ball race on its upper surface, a downwardly directed annular skirt integral with said bearing member in proximate relation to said ball race, a pair of essentially complementary legs integral with said skirt and extending downwardly from the lower margin thereof, opposed parallel journal members integral with said legs and constituting the lower end portion of said legs, said journal members being spaced apart by a distance substantially less than the diameter of said skirt and having axle-carrying holes therein whose common center line is substantially offset from the axis of said skirt by a distance less than the radius of said ball race but greater than half the radius of said ball race, the upper extremity of each of said legs being integral with said skirt from a point approximately where the plane of the journal member intersects said skirt to a point on said skirt intersected by a plane normal to said journal member on the side of said skirt axis remote from said center line, the margin of each of said legs extending from said last-named point being inclined downwardly to said journal member at an angle of approximately 20° to 40° to a vertical plane normal to said journal member, and each of said legs having a compound arch portion characterized by a substantially arcuate journal-plane arch segment which is substantially in the plane of said journal member, which defines the upper margin of said journal member, the radius of which is approximately equal to the radius of said skirt, and the upper extremity of which fairs into said skirt in substantial alignment therewith at the margin of said leg on the side of said center line remote from said skirt axis and further characterized by a succession of substantially arcuate arch segments in planes normal to said axle journal which have respective radii approximately equal to the radius of said skirt, the lower extremities of which are determined respectively by points disposed along substantially the entire length of said journal-plane arch segment and the upper extremities of which fair into said skirt in substantial alignment therewith.

11. In a caster of the character described, a fork member according to claim 10 wherein the ratio of the radius of said skirt to the radius of said ball race is about 1.2 to about 1.7, wherein said center line of said axle-carrying holes is offset from the skirt axis by approximately 77% of the radius of said ball race, wherein the ratio of radius of the ball race to the vertical distance from the top of the fork to the center line of the axle-carrying holes is about .4 to about .5 and wherein the ratio of the skirt radius to the distance between said journal members is about .6 to about 1.3.

JAMES F. MULLEN.
JAMES S. HANSON.

REFERENCES CITED

The following references are of record in the file of this patent:

UNITED STATES PATENTS

| Number | Name | Date |
| --- | --- | --- |
| 1,185,886 | Doherty | June 6, 1916 |
| 1,649,529 | Herold | Nov. 15, 1927 |
| 1,747,319 | Pribil | Feb. 18, 1930 |
| 2,111,561 | Herold | Mar. 22, 1938 |

Certificate of Correction

March 14, 1950

Patent No. 2,500,854

JAMES F. MULLEN ET AL.

It is hereby certified that error appears in the printed specification of the above numbered patent requiring corrections as follows:

Column 3, line 23, for the word "states" read *static*; and that the said Letters Patent should be read with this correction therein that the same may conform to the record of the case in the Patent Office.

Signed and sealed this 20th day of June, A. D. 1950.

[SEAL]

THOMAS F. MURPHY,
*Assistant Commissioner of Patents.*